United States Patent Office 3,671,103
Patented June 20, 1972

3,671,103
DI-LEAD MOLYBDATE ULTRASONIC LIGHT DEFLECTOR
Naoya Uchida, Tokyo, Yoshiro Ohmachi, Tokorozawa-shi, and Nobukazu Niizeki, Shintaro Miyazawa, and Hiroshi Iwasaki, Tokyo, Japan, assignors to Nippon Telegraph and Telephone Public Corporation, Tokyo, Japan
Filed Mar. 31, 1971, Ser. No. 129,860
Claims priority, application Japan, Apr. 9, 1970, 45/30,383; July 13, 1970, 45/61,673, 45/61,674, 45/61,675
Int. Cl. G02f 1/24
U.S. Cl. 350—149     6 Claims

ABSTRACT OF THE DISCLOSURE

A single crystal of di-lead molybdate, $Pb_2MoO_5$, that is $2PbO \cdot MoO_3$, is used as a medium for ultrasonic deflection of light. The light deflecting medium of the present invention enables light and ultrasonic waves transmitting therethrough to be interacted acousto-optically with higher efficiency than that of the prior art and that using tellurium dioxide as the single crystal. The present light deflecting medium displays various effects by several combinations of the propagation directions of light and acoustic waves.

---

This invention relates to an optical beam deflecting system, and more particularly to arrangements for ultrasonic deflection of light by passing light beams and ultrasonic waves through a single crystal deflector medium.

There has heretofore been widely adopted a mechanical deflector in which a prism or a mirror is mechanically vibrated or rotated, thereby deflecting incident optical beams spatially. However, such types of deflectors have the drawbacks that, since they included mechanically movable parts, their long use invited reduced stability and reliability of deflection, and further the deflected spot could not be allowed to travel at an appreciably increased speed.

As alternatives, there have in recent years been proposed various deflectors utilizing the electro-optical effect of single crystal or the acousto-optical effect based on ultrasonic waves passing therethrough. The former type of deflector has a deflecting element consisting of an electro-optical crystal and a double-refractive prism, and actualizes essentially only two deflecting points using one element. Accordingly, it is necessary to arrange many elements in the deflector to obtain a large number of deflecting points resulting in that the practical use of it becomes economically difficult. On the other hand, the latter type of deflector mainly consists of an optical medium transparent to the light used, on the surface of which an electromechanical transducer is evaporated, or at most the two optical mediums having the transducer thereon, whereby light beams can be deflected in two dimensions. Accordingly, the latter type of deflector offers an economic advantage, and is also capable of rendering the device compact. However, this type of deflector has been still encountered with a problem in the selection of a material to be used as an optical medium.

A medium for acousto-optical light deflection utilizing the interacting phenomenon of a light beam and ultrasonic waves requires two most important conditions:

(1) The acousto-optical figure of merit M indicates a large value; and (2) The acoustic attenuation coefficient is small.

Further, to increase the travelling speed of a deflected light beam, it is desired that the acoustic phase-velocity is large.

The above-mentioned acousto-optical figure of merit M is defined by the following equation:

$$M = n^6 / p^2 \rho v^3$$

where:

$n$ is the refractive index of an optical medium,
$p$ is its photoelastic constant,
$\rho$ is its density, and
$v$ is the aforementioned acoustic phase velocity.

M is a guide for indicating the intensity of deflected light beams with respect to ultrasonic waves having a certain acoustic power, that is, the degree of deflecting efficiency.

Generally, a liquid medium is characterized in that the value of M thereof is large because of its small acoustic phase velocity $v$ and of its large photoelastic constant $p$. However, it is difficult to use a liquid substance as a medium for ultrasonic deflection of light in an actual device because: its acoustic attenuation coefficient is large; disturbance of the liquid per se is caused by ultrasonic waves having large acoustic power; and it is inferior in stability for temperature change and long use. However, water, a typical liquid, has been used often in experiments of this kind, and the M value thereof, that is, 126 ($\times 10^{-18}$ sec.$^3$/g.), is regarded as a goal value for a solid medium for acousto-optical deflection of light.

A solid substance is most suitable as the medium for acousto-optical deflection since the stability thereof in long use is good and its acoustic attenuation coefficient is small in general. However, any solid substance, the M value of which is equal to or greater than that of water, is not yet publicly known. For the purpose of increasing the deflection velocity it is preferable to use longtitudinal ultrasonic waves which propagate through the solid medium at a rapid speed. As highly effective mediums for utilizing longitudinal ultrasonic waves, lead molybdate $PbMoO_4$ and tellurium dioxide $TeO_2$ are both used in the form of a single crystal. However, the M value of each of these mediums is about 35 ($\times 10^{-18}$ sec.$^3$/g.), and is no more than one third of that of water.

An object of the present invention is to provide a solid medium for acousto-optical light deflection utilizing the interacting phenomenon of light beams and longitudinal ultrasonic waves over a wide optical wavelength range of from visible to infrared.

Another object of the invention is to provide such medium having large values of M and other excellent physical properties.

Still another object of the invention is to provide such medium displaying various effects by allowing light beams and ultrasonic waves to transmit therethrough in different directions respectively.

These objects may be attained in accordance with the present invention using a single crystal of di-lead molybdate $Pb_2MoO_5$, that is, $2PbO \cdot MoO_3$.

Other important objects and advantageous features of the present invention will be apparent from the following description and accompanying drawings, wherein, for the present purpose of illustration only, specific embodiments are set forth in detail.

In the present invention, a single crystal of di-lead molybdate having a chemical composition $Pb_2MoO_5$, i.e., $2PbO \cdot MoO_3$ is used as a medium for allowing ultrasonic waves and a light beam to interact. This single crystal is different from that of lead molybdate PbMoO$_4$, i.e., PbO·MoO$_3$, which has been known as a medium of this kind, in chemical composition and crystal structure. In crystal system, lead molybdate belongs to tetragonal system, while di-lead molybdate belongs to monoclinic system. A single crystal of di-lead molybdate having a large size of about 10 mm. x 10 mm. x 10 mm. can be prepared by the process which comprises mixing two mol parts of lead mono-oxide PbO with 1 mol part of molybdenum trioxide each in powder state, melting the obtained mixture at a temperature of over 960° C. in a platinum pot or other, and growing a single crystal of di-lead molybdate from the melted compound by so-called pulling method. The specific gravity of this single crystal is 7.1 and it is transparent to light having wave lengths in the range of 340 m$\mu$ to at least 2.5$\mu$. Crystallographic properties of this single crystal will be explained below referring to FIG. 1. Of the crystal axes $a$, $b$ and $c$ of this crystal, axis $b$ is set parallel to a unique two-fold rotation axis of this crystal, and axes $a$ and $c$ are set perpendicular to said $b$ axis. Unit cell dimensions of this crystal and axial angle $\beta$ (the angle between axes $a$ and $c$) are as follows: $a=14.225$ A., $b=5.789$ A., $c=7.336$ A.; $\beta=114.0°$. Directions of these axes can be determined easily and unequivocally by means of X-ray diffraction photography taking into consideration the fact that the space group of this crystal is $C^3_{2h}$, i.e., 21 m.

Figure 1:
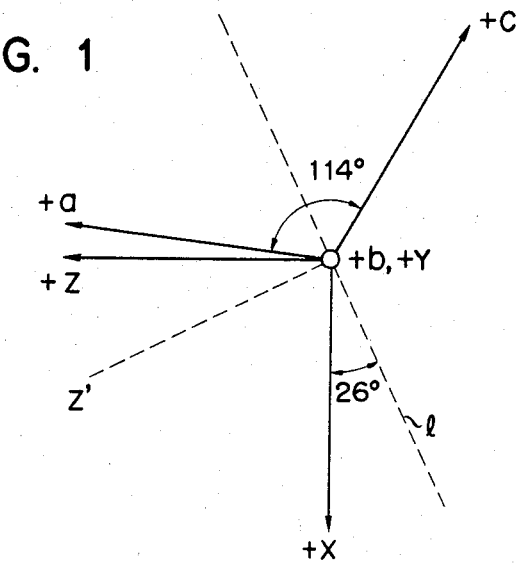
FIG. 1 is an explanatory perspective view of the geometrical relation between crystallographic axes and optic elasticity axes of the di-lead molybdate single crystal.

In FIG. 1, axis $b$ is perpendicular to the paper plane. This crystal has quite a perfect cleavage plane parallel to axis $b$. The line $l$ stands for a locus of this cleavage plane on the $a$–$c$ plane. The index of the cleavage plane is $(20\bar{1})$ according to the above-mentioned definition of the three axes.

Generally optical properties of a crystal are specified by directions and dimensions of its principal axes of the index ellipsoid, X, Y and Z. The single crystal of di-lead molybdate crystallographically belongs to monoclinic system as mentioned before. By the definitions generally accepted, the refractive indices for the light waves which are plane-polarized parallel to X, Y and Z directions specified as N$x$, N$y$ and N$z$ respectively, and these directions are found to have the values of N$x$, N$y$ and N$z$ are defined as X, Y and Z axes of this crystal. Thus, the defined Y axis is parallel to the unique two-fold rotation axis, i.e., $b$ axis. The axes X, Y and Z intersect each other three-dimensionally at right angles, and the relation between these axes and the crystal axes $a$, $b$ and $c$ are depicted in FIG. 1. The angle between the dotted line $l$ and the X axis varies slightly depending upon wavelength of the light, whereas the angle is 26° for the light having a wavelength 6328 A. The directions of X and Z axes can be readily identified under a polarizing microscope with a light beam incident on the crystal along its $b$ axis.

Through such a single crystal of di-lead molybdate, longitudinal ultrasonic waves can be propagated along some specific directions. On the other hand, a polarized light beam is propagated through the crystal in a proper direction so that the specific light beam is deflected by acousto-optical interaction, with the specific ultrasonic wave.

An embodiment of the arrangement for ultrasonic deflection of light in accordance with the present invention is explained below with FIG. 2 being referred to.

Figure 2:
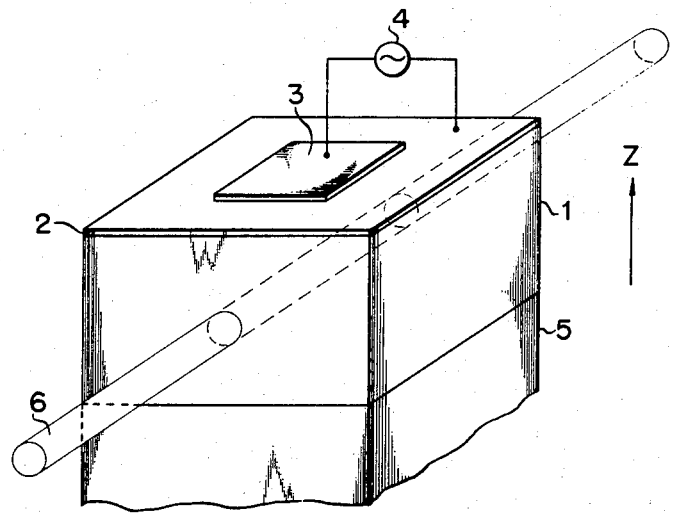
FIG. 2 is a schematic perspective view of an arrangement for one-dimensional acousto-optical light deflection, using one single crystal medium.

In FIG. 2, 1 is a medium for light deflection, that is, a single crystal of di-lead molybdate, having a cubic shape and dimensions of about 10 mm. x 10 mm. x 10 mm. A surface of the medium 1, across which ultrasonic waves are to be propagated, is coated with an input electrode 2 nearly all over the surface. To this electrode, an electro-acoustic transducer 3 is bonded. The transducer is a single crystal of, for instance, quartz or lithium niobate 5 mm. in side length having a thickness adequate to generate a required acoustic frequency. Instead of such a single crystal bonded to the medium, cadmium sulfide or zinc oxide may be deposited by vacuum evaporation so as to make a transducer element thereupon. A high frequency driving circuit 4 is connected between the second electrode on the transducer 3 and the input electrode 2. Thereby a desired electric signal of a frequency 1 mHz. to 1 gHz. can be generated. An acoustic absorber 5, which absorbs the ultrasonic waves passing through the medium, is fixed to another surface of the medium 1 opposite to the input electrode 2. A light beam 6 is transmitted through the medium in a direction in parallel to the wave front of the ultrasonic wave or aslant thereto at most by several degrees.

In the thus arranged apparatus, an electric signal input from the high frequency driving circuit 4 is converted to a longitudinal ultrasonic wave by the transducer 3, and it propagates through the medium 1. The propagating ultrasonic wave causes a slight change in the refraction index of the medium by virtue of the photoelastic effect, and thereby an optical phase grating is formed by the periodically changing refraction index. The direction of the grating is parallel to the wave front of the ultrasonic wave. A light beam 6 incident upon the thus formed optical phase grating with a specific angle is angularly deflected partially or completely from the direction of the incident beam. As a rule, the deflecting angle is approximately proportional to the frequency of the ultrasonic wave in the medium 1. Therefore, the spatial position of the deflected light beam can be altered by varying the frequency of the electric signal supplied to the transducer 3 from the high frequency driving circuit 4.

When the above apparatus is employed, the above-mentioned M, that is, the acousto-optical figure of merit representing the efficiency of deflection can take varied values depending upon combinations of propagating directions of the ultrasonic wave, and the light beam and the polarizing direction thereof. Several examples among such combinations are shown in Table 1. In the table, Z' stands for a direction perpendicular to the locus of cleavage plane $l$ as indicated in FIG. 1. As to X, Y and Z, explanations have been given above with respect to FIG. 1.

TABLE 1

| Combination No. | Longitudinal acoustic wave | | Optical wave | | Figure of merit M ($\times 10^{-18}$ sec.$^3$/g.) |
|---|---|---|---|---|---|
| | Propagating direction | Velocity ($\times 10^5$ cm./s.) | Propagating direction | Polarization direction | |
| 1 | X | 2.96 | Z | Y | 127 |
| 2 | X | 2.96 | Z | X | 60 |
| 3 | Z | 3.28 | Y | Z | 65 |
| 4 | Z' | 3.05 | Y | Z | 74 |

X, Y and Z respectively stand for directions of principal axes of the index ellipsoid for a light wave of 6328 A. These directions would change slightly when different optical wavelengths are employed. However, the results of experiments revealed that the angular deviation of these directions by less than several degrees from the directions of X, Y and Z does not cause any change in the M value.

The values of M shown in Table 1 are between 60 and 127 ($\times 10^{-18}$ sec.$^3$/g.) and are approximately twice or three times as much as the M value 37 ($\times 10^{-18}$ sec.$^3$/g.) of the known PbMoO$_4$ single crystal, or 35 ($\times 10^{-18}$ sec.$^3$/g.) of the known TeO$_2$ single crystal. Especially in combination No. 1, the M value is 127, which is nearly the same as the M value of water as mentioned hereinbefore. That is to say, as to the acousto-optic light deflection efficiency, the single crystal of di-lead molybdate is better than any known single crystal medium. Furthermore, the acoustic absorption degree of the single crystal of the present invention is about 2.5 db/cm. at the acoustic frequency of 200 mHz. This means that if acoustic absorption up to several db/cm. can be tolerated, employment of high frequency ultrasonic waves up to several hundred mHz is possible, and so wide band deflection is made possible. For instance, when a high frequency ultrasonic wave of 500 mHz is employed, polarized light can be deflected to about two hundred of resolvable points.

It is judged from the acoustic wave velocity in the medium that, if the single crystal medium of this invention is used, an arrangement can be provided which can deflect the incident light from one direction to another within 1 to 2 microseconds. This arrangement makes it possible to achieve a deflection speed several times as fast as that achieved by a $TeO_2$ single crystal medium with low speed transversal ultaronsic waves being employed.

Figure 3:
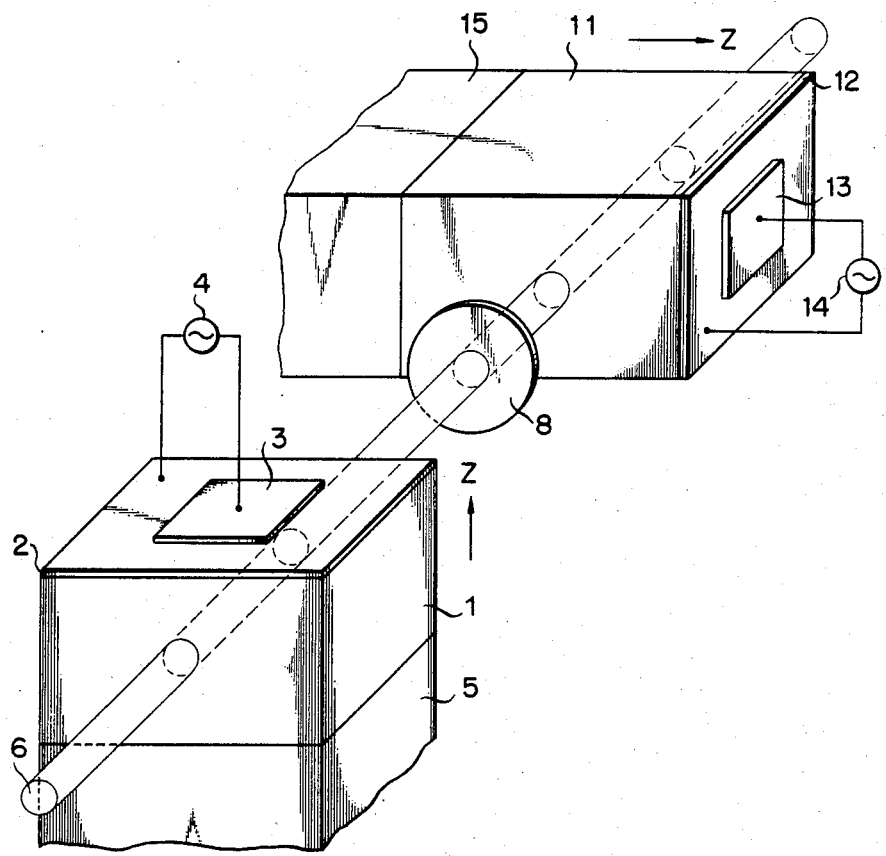
FIG. 3 is a schematic perspective view of another arrangement for two-dimensional acousto-optical light deflection, using two single crystal mediums.

Another embodiment of the arrangement for ultrasonic deflection of light in accordance with the present invention is illustrated in FIG. 3. This embodiment represents an arrangement in which two units of the single crystal medium device as shown in FIG. 2 are combined in such a manner that the propagating direction of acoustic waves in one device is perpendicular to that in the other device. A polarized light beam 6 is vertically deflected by the first crystal medium 1, and the plane of polarization of said deflected light beam is rotated by 90° by means of a half wave plate 8. Thereafter the light beam is transmitted through the second crystal medium 11, wherein the beam is further horizontally deflected. In FIG. 3, 12 is an input electrode, 13 is an electro-acoustic transducer, 14 is a high frequency driving circuit and 15 is an acoustic absorber.

As has been explained hereinbefore, the angle of the vertical deflection can be controlled, by adjusting the frequency of the high frequency driving circuit 4, and the angle of the horizontal deflection can be controlled by adjusting the frequency of the high frequency driving circuit 14. Thus two-dimensional deflections of various types such as analog-scanning type, digital-deflection type, etc. can be effected by inserting synchronizing, frequency-dividing, or frequency-multiplying devices; and/or a suitable modulation system between the two high frequency driving circuits.

In this embodiment, the propagation directions of ultrasonic waves in each of the single crystal medium 1 and 11 are selected from those listed in Table 1, and these two directions may be identical or different under the only condition that the two mediums are spatially arranged so that these two directions are perpendicular to each other.

As has been explained, high-speed light deflection can be effected with high deflection efficiency, and a large number of resolvable points can be achieved over a wide range of optical wavelength from infrared to visible by the employment of the arrangements of the present invention.

What we claim is:

1. In an arrangement for acousto-optical light deflection including a single crystal light deflecting medium, means for propagating longitudinal ultrasonic waves through said medium in a predetermined direction, and means for propagating a light beam through said medium in a predetermined direction so as to cause the light beam to interact with the ultrasonic waves acousto-optically in said medium, an arrangement for acousto-optical light deflection comprising a single crystal of di-lead molybdate, that is, $2PbO \cdot MoO_3$, as the light deflecting medium.

2. An arrangement for acousto-optical light deflection according to claim 1 wherein the propagating direction of the longitudinal acoustic wave is parallel to the principal axis X of the index ellipsoid of the single crystal medium; the propagating direction of the light beam is substantially parallel to the principal axis Z of the same; and the polarization direction of the optical wave is substantially parallel to the principal axis Y of the same.

3. An arrangement for acousto-optical light deflection according to claim 1 wherein the propagating direction of the longitudinal acoustic wave is parallel to the principal axis X of the index ellipsoid of the single crystal medium; the propagating direction of the light beam is substantially parallel to the principal axis Z of the same; and the polarization direction of the optical wave is substantially parallel to the principal axis X of the same.

4. An arrangement for acousto-optical light deflection according to claim 1 wherein the propagating direction of the longitudinal acoustic wave is parallel to the principal axis Z of the index ellipsoid of the single crystal medium; the propagating direction of the light beam is substantially parallel to the principal axis Y of the same, and the polarization direction of the light beam is substantially parallel to the principal axis Z of the same.

5. An arrangement for acousto-optical light deflection according to claim 1 wherein the propagating direction of the longitudinal acoustic wave is perpendicular to the unique cleavage plane $(20\bar{1})$ of said single crystal medium; the propagating direction of the light beam is substantially parallel to the principal axis Y of the same; and the polarization direction of the light beam is substantially parallel to the principal axis Z of the same.

6. An arrangement for two-dimensional acousto-optical light deflections comprising two light deflecting mediums made of di-lead molybdate single crystal; means for propagating ultrasonic waves for each medium in a given direction; a half wavelength plate positioned between said two deflecting mediums for rotating the polarization plane of a light beam after propagating the first medium; and means for transmitting a light beam through said two mediums in series so as to cause the light beam to interact with the ultrasonic wave acousto-optically in said mediums respectively, whereby the light beam deflected in certain directions by the first medium is again deflected by the second medium in appropriately rotated directions.

References Cited

Ohmachi et al., "Acoustic and Acousto-Optical Properties of $Pb_2/MoO_5$ Single Crystal," J. App. Phys., vol. 42, No. 2 (February 1971), pp. 521–524.

DAVID SCHONBERG, Primary Examiner

P. R. MILLER, Assistant Examiner

U.S. Cl. X.R.

350—157, 161